(12) United States Patent
Masuki

(10) Patent No.: US 8,134,785 B2
(45) Date of Patent: Mar. 13, 2012

(54) IMAGING APPARATUS

(75) Inventor: Akihiko Masuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/018,262

(22) Filed: Jan. 31, 2011

(65) Prior Publication Data

US 2011/0194193 A1 Aug. 11, 2011

(30) Foreign Application Priority Data

Feb. 5, 2010 (JP) ................................. 2010-024603

(51) Int. Cl.
*G02B 15/14* (2006.01)
(52) U.S. Cl. ........................................ 359/700; 359/694
(58) Field of Classification Search .................. 359/700, 359/817

See application file for complete search history.

(56) References Cited

U.S. PATENT DOCUMENTS

2007/0019948 A1* 1/2007 Terada ........................... 396/349
2011/0109981 A1* 5/2011 Yamamoto et al. ........... 359/817

FOREIGN PATENT DOCUMENTS

JP 07-199295 A 8/1995

* cited by examiner

*Primary Examiner* — Ricky Mack
*Assistant Examiner* — James Jones
(74) *Attorney, Agent, or Firm* — Canon USA Inc. IP Division

(57) ABSTRACT

An imaging apparatus has in a first cam groove a first cam surface whose lead is lying with respect to the rotating direction of a drive ring, and a second cam surface whose lead is steep with respect to the rotating direction of the drive ring, and when transition is effected from an accommodated state to a use state, a follower member passes the first cam surface, and when transition is effected from the state where the follower member is engaged with a second cam groove to the accommodated state, the follower member passes the second cam surface.

5 Claims, 11 Drawing Sheets

SECTION A-A

SECTION B-B

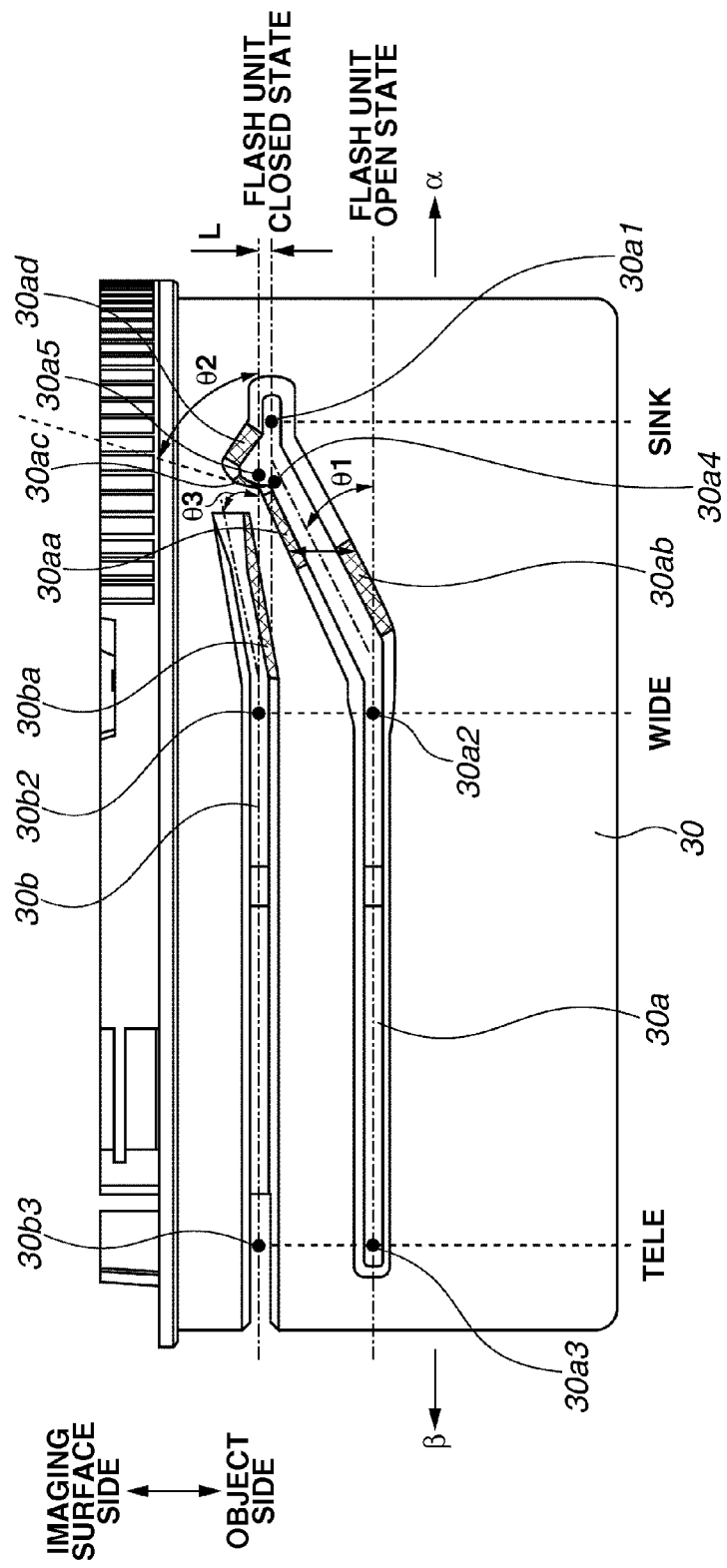

IMAGING APPARATUS

BACKGROUND OF THE INVENTION

1. Field of the Invention

The present invention relates to an imaging apparatus having a light emitting portion shifting between a use state and an accommodated state.

2. Description of the Related Art

Conventionally, in an imaging apparatus of this type, a light emitting unit is placed in the accommodated state when imaging is impossible such as when the power is off, and is placed in the use state, in which it protrudes from the imaging apparatus main body, when imaging is possible such as when the power is off.

In Japanese Patent Application Laid-Open No. 07-199295, there is discussed an imaging apparatus in which the light emitting unit is shifted between the use state and the accommodated state in synchronization with an operation of extending a lens barrel from a retracted state and with an operation of retracting thereof to the retracted state.

In the conventional imaging apparatus, in the state in which the lens barrel has been extended to enable imaging, the light emitting unit is always in the use state, i.e. the protruded state, and, in the retracted state in which the lens barrel has been retracted to disable imaging, the light emitting unit is always in the accommodated state.

This construction is advantageous in that the light emitting unit is placed in the use state in which it protrudes simultaneously with turning on of the power, thereby preventing loss of an opportunity for imaging. However, even when no flash is to be emitted, the light emitting unit is caused to protrude simultaneously with the turning on of the power, so that the subject may expect light emission of the flash unit.

Further, when the shift of the light emitting unit between the use state and the accommodated state is synchronized with the shift of the lens barrel between the retracted position and the extended position, the light emitting unit always protrudes in the state in which imaging is possible (photographable state), thus hindering the holding of the imaging apparatus.

SUMMARY OF THE INVENTION

The present invention is directed to an imaging apparatus capable of placing a light emitting unit, which has been in a use state in a photographable state, in an accommodated state through manual operation, and of placing the imaging apparatus in a state where imaging is impossible (unphotographable state) while keeping the light emitting unit in the accommodated state.

According to an aspect of the present invention, an imaging apparatus includes a drive source, a driven member driven by the drive source, a light emitting unit connected to an interlock portion interlocked with the driven member, a first cam formed on the driven member, wherein the first cam has a first inclined portion and configured to, when the first cam is engaged with the interlock portion and the imaging apparatus is placed in a photographable state, place the light emitting unit in a use state, and when the imaging apparatus is placed in a unphotographable state, place the light emitting unit in a accommodated state, wherein the first cam has, apart from the first inclined portion engaged with the interlock portion in transition of the imaging apparatus from the unphotographable state to the photographable state, a second inclined portion more inclined than the first inclined portion; and a second cam formed on the driven member, wherein in a case where the light emitting unit is shifted from the use state to the accommodated state through manual operation when the imaging apparatus is placed to the photographable state, the interlock portion is engaged after being released from the engagement with the first cam to be engaged with the second cam, wherein in a state where the second cam is engaged with the interlock portion, when the imaging apparatus is placed in the unphotographable state from the photographable state, the second cam is configured to be released from the engagement with the interlock portion before the light emitting unit is engaged with the first cam, wherein, when the imaging apparatus is placed from the photographable state to the unphotographable state, the engagement portion is released from the engagement with the second cam to be engaged with the second inclined portion of the first cam.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 11 illustrates the cam configurations formed on the drive ring 30.

DESCRIPTION OF THE EMBODIMENTS

Various exemplary embodiments, features, and aspects of the invention will be described in detail below with reference to the drawings.

[Four States of a Digital Camera]

FIGS. 1A through 1D illustrate a digital camera serving as an imaging apparatus according to an exemplary embodiment of the present invention, and more specifically FIGS. 1A through 1D respectively illustrate four states of the digital camera of the present exemplary embodiment.

Figure 1A:
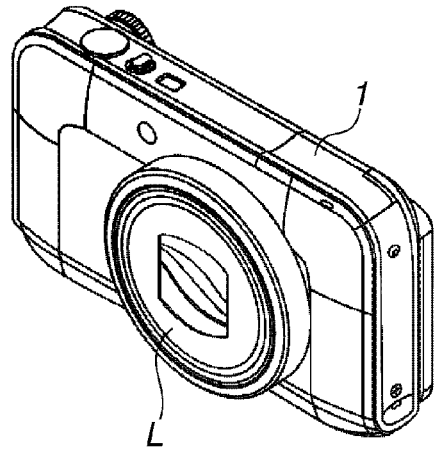
FIGS. 1A through 1D are external perspective views of a digital camera according to an exemplary embodiment of the present invention.

FIG. 1A illustrates a power OFF state, which is an example of an unphotographable state (unphotographable state). In this state, a lens barrel unit L is in a retracted state, and a light emitting unit 1 is in an accommodated state.

Figure 1B:
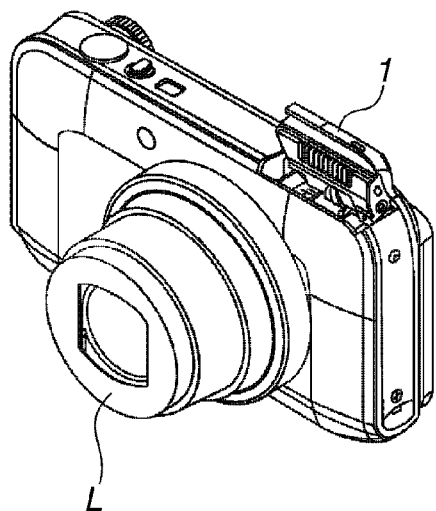

FIG. 1B illustrates a power ON state, which is an example of a state where imaging is possible (photographable state). In this state, the lens barrel unit L is in an extended state, and the light emitting unit 1 is in a use state. Herein, transition is performed from the unphotographable state to the state where imaging is possible.

Figure 1C:
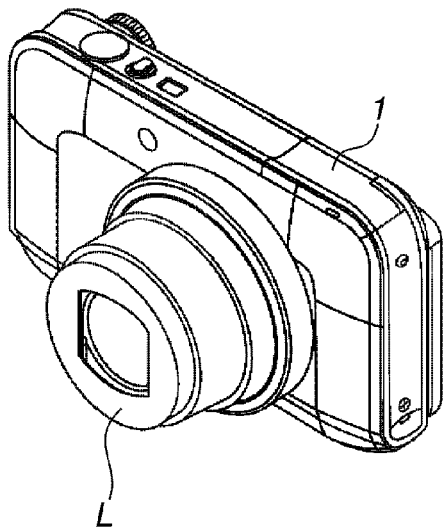

FIG. 1C illustrates a state in which the light emitting unit 1 has been shifted from the use state of FIG. 1B to the accommodated state through manual operation. In this state, the lens barrel unit L is in the extended state, and the light emitting unit 1 is in the accommodated state.

Figure 1D:
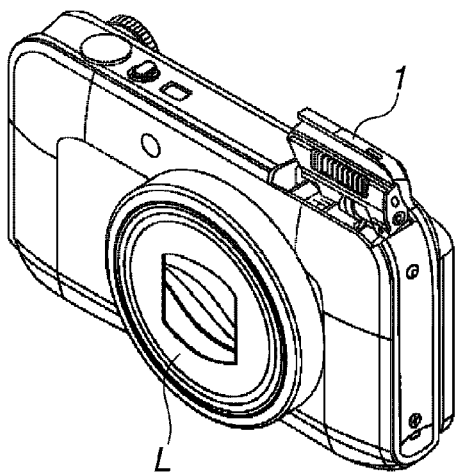

FIG. 1D illustrates a state in which the light emitting unit 1 has been shifted from the accommodated state of FIG. 1A to the use state through manual operation. In this state, the lens barrel unit L is in the retracted state, and the light emitting unit 1 is in the use state.

The digital camera according to the present exemplary embodiment can be placed in the state of FIG. 1C from the state of FIG. 1B through manual operation. And, when the power is turned off in the state of FIG. 1C, the digital camera is placed in the state of FIG. 1A, with the light emitting unit 1 remaining in the accommodated state. Further, the digital camera of the present exemplary embodiment can be placed in the state of FIG. 1D from the state of FIG. 1A. And, when the power is turned on in the state of FIG. 1D, the digital camera is placed in the state of FIG. 1B, with a light emitting portion S remaining in the use state.

[Exploded Perspective View of the Lens Barrel Unit L]

Figure 2:
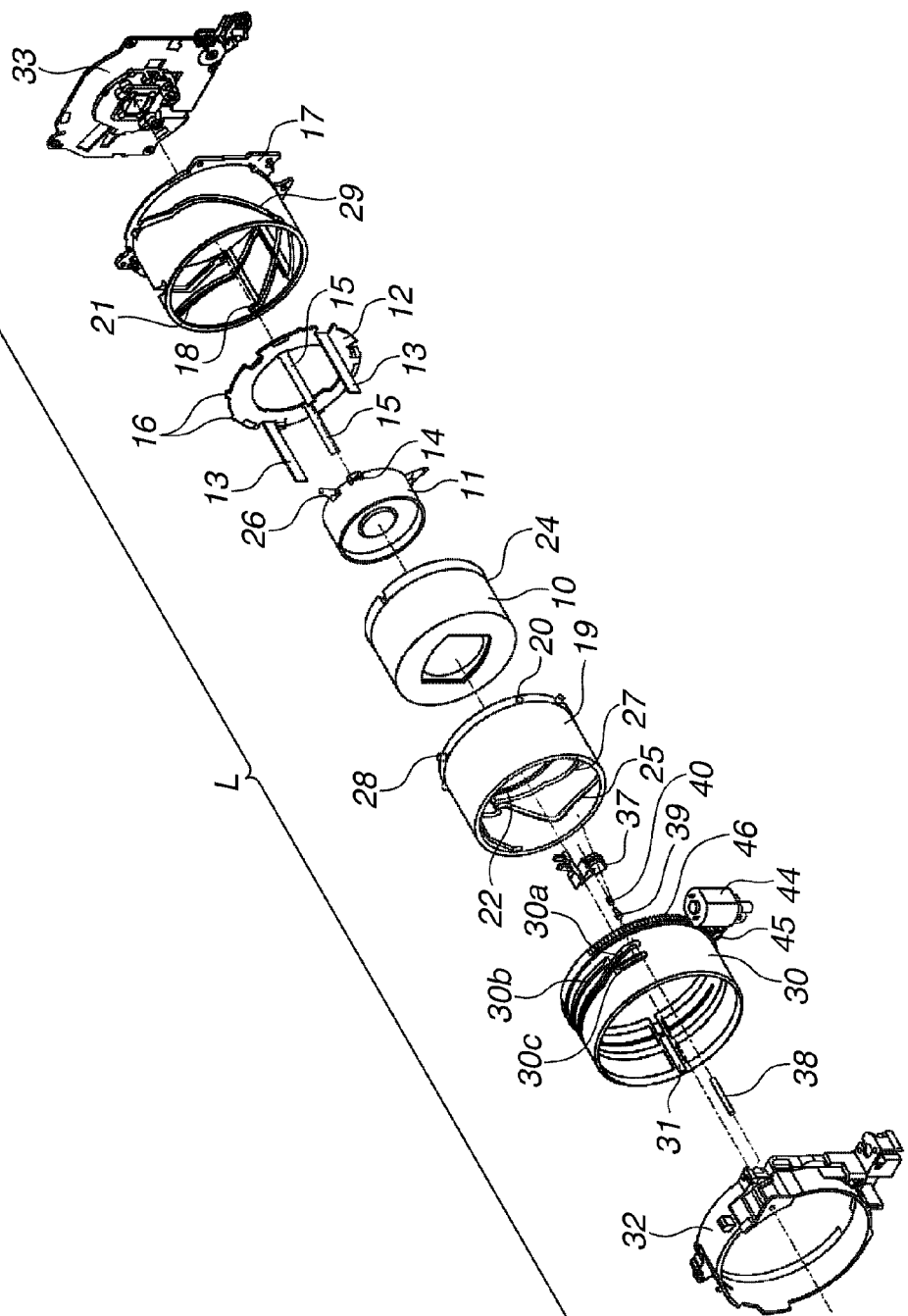
FIG. 2 is an exploded perspective view of a lens barrel unit.

FIG. 2 is an exploded perspective view of the lens barrel unit L of the digital camera.

The lens barrel unit L is composed of a first lens unit, a second lens unit, and a third lens unit (not illustrated). The first lens unit is retained by a first lens unit holder 10, and the second lens unit is retained by a second lens unit holder 11. An advancement guide plate 12 has first lens unit guide bars 13 supporting the first lens unit holder 10 so as to allow it to move in the optical axis direction.

The first lens unit guide bars 13 are engaged with a groove (not illustrated) formed in the inner surface of the first lens unit holder 10 and extending in the optical axis direction.

Similarly, integrally formed on the advancement guide plate 12 are second lens unit guide bars 15 supporting the second lens unit holder 11 so as to allow it to move in the optical axis direction. The second lens unit guide bars 15 are engaged with a second lens unit advancement hole 14 provided in the outer peripheral portion of the second lens unit holder 11, and support the second lens unit holder 11 so as to allow it to move in the optical axis direction.

Thus, due to the first lens unit guide bars 13 and the second lens unit guide bars 15 formed on the advancement guide plate 12, the first lens unit holder 10 and the second lens unit holder 11 are guided in their movement in the optical axis direction. Further, a plurality of protrusions 16 are formed on the outer edge portion of a flange portion of the advancement guide plate 12. The protrusions 16 are respectively engaged with a plurality of grooves 18 provided in the inner surface of a stationary cam ring 17 and extending in the optical axis direction, whereby the advancement guide plate 12 is supported so as to be capable of moving in the optical axis direction.

On the outer peripheral surface of a movable cam ring 19, there are formed cam followers 20 so as to divide the outer peripheral surface into three equal parts. The cam followers 20 are respectively cam-engaged with three cams 21 of the same configuration formed on the inner surface of the stationary cam ring 17. As a result, the cam followers 20 trace the cams 21 as the movable cam ring 19 rotates, with the movable cam ring 19 moving in the optical axis direction while rotating.

Further, hooks 13 of the advancement guide plate 12 are engaged with engagement grooves 22 provided at the rear end portion of the inner peripheral surface of the movable cam ring 19, whereby the advancement guide plate 12 is engaged with the movable cam ring 19 so as to be rotatable. As a result, as the movable cam ring 19 moves in the optical axis direction, the advancement guide plate 12 also moves in the optical axis direction.

On the outer peripheral surface portion of the first lens unit holder 10, there are formed first lens unit cam followers 24 so as to divide the outer peripheral surface into three equal parts. The first lens unit cam followers 24 are respectively cam-engaged with three first lens unit cams 25 of the same configuration provided on the inner peripheral surface of the movable cam ring 19. As a result, as the movable cam ring 19 rotates, the first lens unit cam followers 24 trace the first lens unit cams 25.

Further, the first lens unit holder 10 is guided so as to move in the optical axis direction, so that, as the movable cam ring 19 rotates, the first lens unit holder 10 moves according to the amount of displacement in the optical axis direction of the first lens unit cams 25.

On the outer peripheral surface portion of the second lens unit holder 11, there are formed second lens unit cam followers 26 so as to divide the outer peripheral surface into three equal parts. The second lens unit cam followers 26 are respectively cam-engaged with three second lens unit cams 27 of the same configuration provided on the inner peripheral surface of the movable cam ring 19. As a result, as the movable cam ring 19 rotates, the second lens unit cam followers 26 trace the second lens unit cams 27.

Further, the second lens unit holder 11 is guided so as to move in the optical axis direction, so that, as the movable cam ring 19 rotates, the second lens unit holder 11 moves according to the amount of displacement in the optical axis direction of the second lens unit cams 27.

On the outer peripheral surface of the movable cam ring 19, there are formed drive pins 28 so as to divide the outer peripheral surface three equal parts. The drive pins 28 pass through a cam hole 29 extending from the inner peripheral surface to the outer peripheral surface of the stationary cam ring 17 to protrude from the outer peripheral surface of the stationary cam ring 17. The cams 21 and the cam hole 29 are of the same configuration, and, upon rotational extending movement of the movable cam ring 19 with respect to the stationary cam ring 17, the drive pins 28 trace the cam hole 29 to maintain the state in which they protrude from the cam ring 17.

The drive ring 30 as a drive member is fitted in the outer peripheral surface of the stationary cam ring 17 to be rotatably supported. In the inner peripheral surface of the drive ring 30, there are arranged grooves 31 extending in the optical axis direction so as to divide the inner peripheral surface into three equal parts, and the drive pins 28 are respectively engaged with the grooves 31. As a result, the rotation of the drive ring 30 is transmitted to the movable cam ring 19 via the grooves 31 and the drive pins 28.

In this way, the first lens unit holder 10, the second lens unit holder 11, the advancement guide plate 12, the stationary cam ring 17, the movable cam ring 19, and the drive ring 30 are integrated, and operate in cooperation with each other. And, the components thus integrated are incorporated into a lens barrel base 32. Further, an imaging device holder 33 retaining an imaging device is fixed so as to hold the flange portion of the stationary cam ring 17 together with the lens barrel base 32.

A drive source 44 of the lens barrel unit L is an electromagnetic motor converting electric power to motive power.

The power of the drive source 44 is transmitted via a gear row 45 to a drive ring gear 46 formed on the outer peripheral surface of the drive ring 30. As a result, it is possible to rotate the drive ring 30 through power supply to the drive source 44.

The lens barrel base 32 retains the drive source 44 and the gear row 45, and retains a slider 37 as a moving member so as to allow it to move in the optical axis direction. The slider 37 is guided by a slider shaft 38 retained by the lens barrel base 32, whereby it can move in the optical axis direction on the lens barrel base 32. Formed on the slider 37 is a flash unit follower 39 as a follower capable of advancing and retreating within the slider 37, and the flash unit follower 39 is urged by a compression spring 40 so as to protrude from the slider 37.

Formed on the outer peripheral surface of the drive ring 30 are a first flash unit cam 30a capable of being engaged with the flash unit follower 39, a second flash unit cam 30b, and a third flash unit cam 30c. When the flash unit follower 39 is engaged with the first flash unit cam 30a, as the drive ring 30 rotates, the slider 37 moves in the optical axis direction on the lens barrel base 32.

[Lens Barrel Unit L]

Figure 3A:
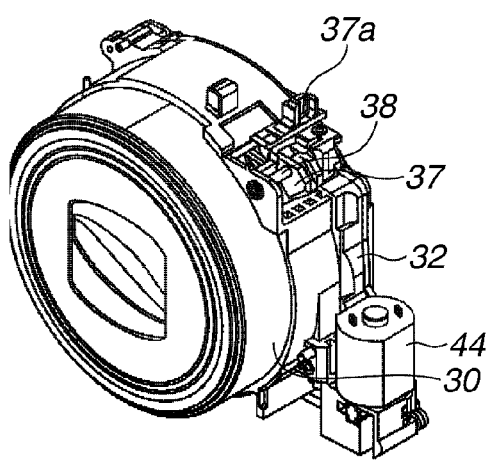
FIGS. 3A through 3C illustrate the lens barrel unit.
Figure 3B:
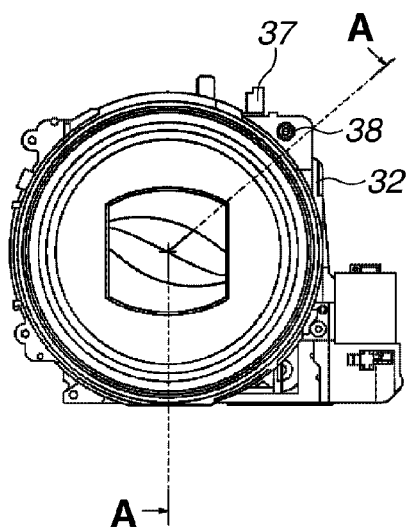
Figure 3C:
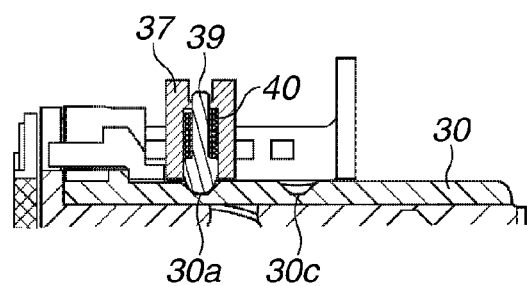

FIGS. 3A through 3C illustrate the lens barrel unit L. FIG. 3A is an external perspective view of the lens barrel unit L. In the state of FIG. 3A, the lens barrel unit L is in the retracted state. FIG. 3B is an external front view of the lens barrel unit L in the state of FIG. 3A. FIG. 3C is a sectional view of the lens barrel unit L taken along the line A-A of FIG. 3B.

As illustrated in FIG. 3A, the slider 37 has a U-shaped portion 37a, which holds a protrusion 408b protruding from a flash unit holder 408 described below. As illustrated in FIG. 3C, the slider 37 has a hole portion substantially perpendicular to the outer peripheral surface of the drive ring 30, with the slider 37 being supported by a slider shaft 38. The flash unit follower 39 and the compression spring 40 are inserted into this hole portion. In the state of FIG. 3C, the flash unit follower 39 is engaged with the first flash unit cam 30a.

[Exploded Perspective View of Light Emitting Unit 1]

Figures 4A, 4B:
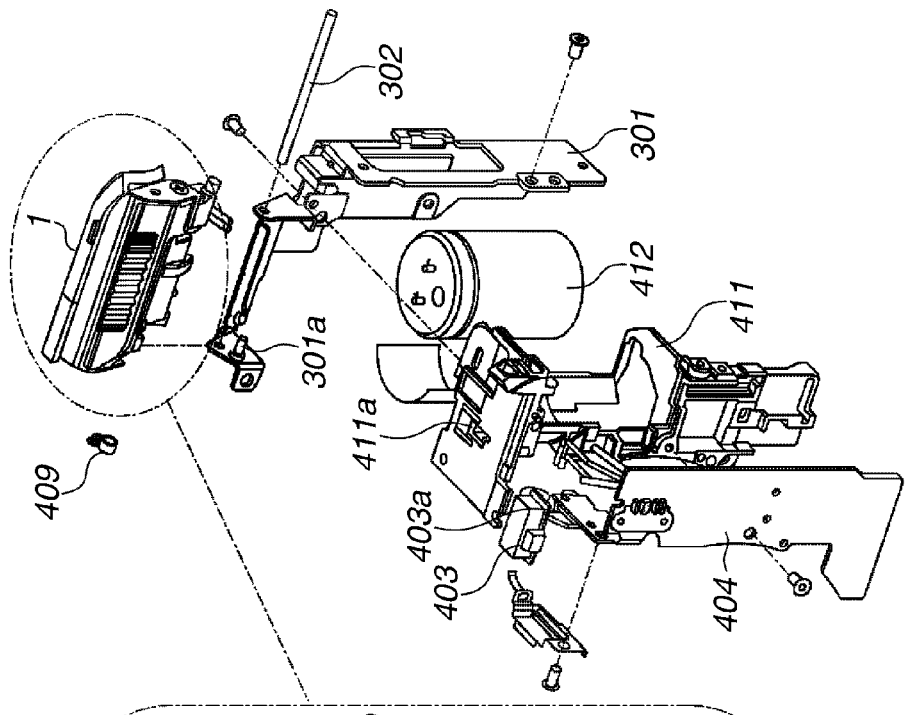
FIG. 4 is an exploded perspective view of a light emitting unit.

FIGS. 4A and 4B are exploded perspective views illustrating a part of the light emitting unit 1 of the digital camera in more detail. FIG. 4A is an exploded perspective view of the light emitting unit 1. A xenon tube 401 is electrically connected via an inclined line 402 to a flexible wiring board 403 illustrated in FIG. 4B. The flexible wiring board 403 is electrically connected to a flash light board 404 that controls light emission.

A reflector 405 condenses light from the xenon tube 401. Xenon tube rubber members 406 insulate the terminal portions of the xenon tube 401, and urge the xenon tube 401 toward the reflector 405. A prism panel 407 irradiates a desired range with the light from the xenon tube 401 and the reflector 405.

The xenon tube 401, the reflector 405, the xenon tube rubber members 406, and the prism panel 407 are arranged on a flash unit holder 408, and then a flash unit cover 2 is fixed to the flash unit holder 408 with a screw, whereby the light emitting unit 1 is assembled.

FIG. 4B is a diagram illustrating a structure retaining the light emitting unit 1 so as to be movable between the use state and the accommodated state. The light emitting unit 1 is supported by a flash unit shaft 302 so as to be rotatable with respect to a flash unit base 301. Forced into the flash unit holder 408 is a shaft 410 on which one end of a toggle spring 409 is hooked.

The other end of the toggle spring 409 is hooked on a shaft 301a provided on the flash unit base 301. The toggle spring 409 functions as an urging member urging the light emitting unit 1 to the use state and the accommodated state, using the flash unit shaft 302 as the rotation center.

The flexible wiring board 403, the flash unit board 404, and a flash unit capacitor 412 are mounted on a mounting member 411. The flash unit base 301 is also mounted to the mounting member 411 by a screw.

A lever type detection switch 403a is mounted on the flexible wiring board 403, and detects whether the light emitting unit 1 is in the use state or the accommodated state. The lever type detection switch 403a is arranged in such a manner that a lever portion thereof protrudes from a hole 411a provided in the mounting member 411. Thus, when the light emitting unit 1 is in the accommodated state, a protrusion 408a of the flash unit holder 408 pushes in the lever portion of the detection switch 403a.

On the other hand, when the light emitting unit 1 is in the use state, the protrusion 408a does not come into contact with the lever portion of the detection switch 403a. Only when the light emitting unit 1 is detected to be in the use state by the detection switch 403a, the digital camera performs control to cause the light emitting unit 1 to emit light.

[Driving of the Light Emitting Portion of the Digital Camera]

Figure 5:
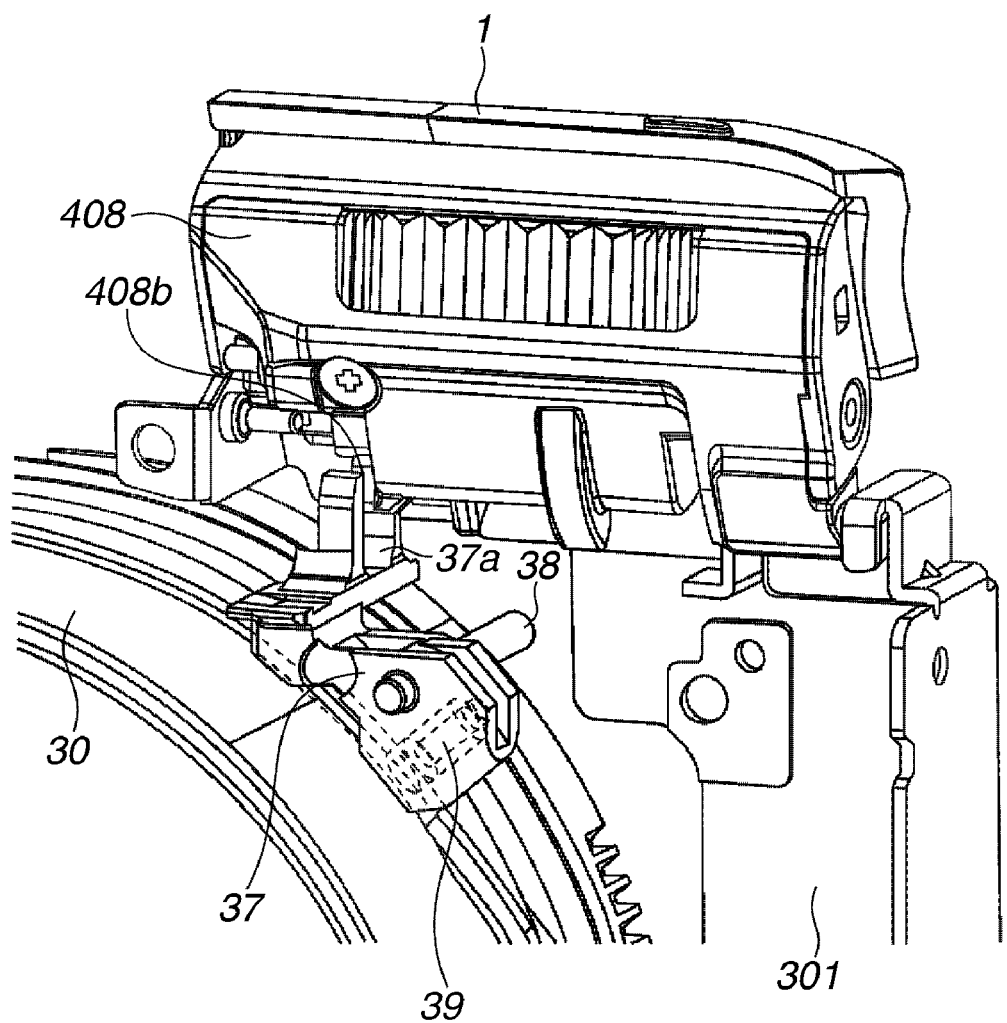
FIG. 5 illustrates a light emitting portion.

FIG. 5 is a diagram illustrating the driving of the light emitting portion of the digital camera. In the present exemplary embodiment, the light emitting unit 1 and the slider 37 are collectively referred to as the light emitting portion.

In FIG. 5, the lens barrel base 32, the mounting member 411, etc. are omitted. As described above, when the drive ring 30 rotates, the flash unit follower 39 traces the first flash unit cam 30a, and the slider 37 moves in the optical axis direction. And, the light emitting unit 1 is supported so as to be rotatable with respect to the flash unit base 301.

As illustrated in FIG. 5, a protrusion 408b protruding from the flash unit holder 408 enters the U-shaped portion 37a formed in the slider 37. Thus, when the slider 37 moves in the optical axis direction, a wall 37a1 or a wall 37a2 of the U-shaped portion 37a pushes the protrusion 408b therein, whereby the light emitting unit 1 is shifted between the accommodated state and the use state.

Figure 6A:
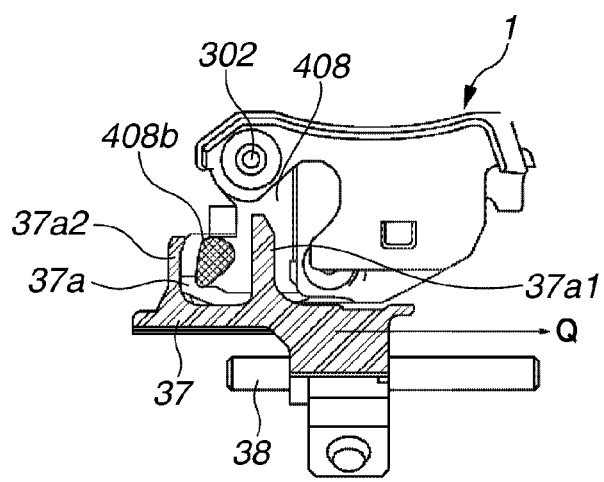
FIGS. 6A through 6C illustrate an operation of shifting the light emitting portion between a use state and an accommodated state.
Figure 6B:
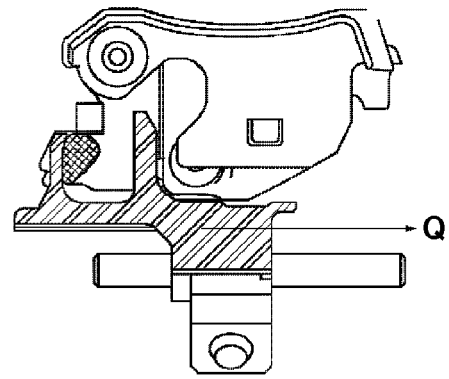
Figure 6C:
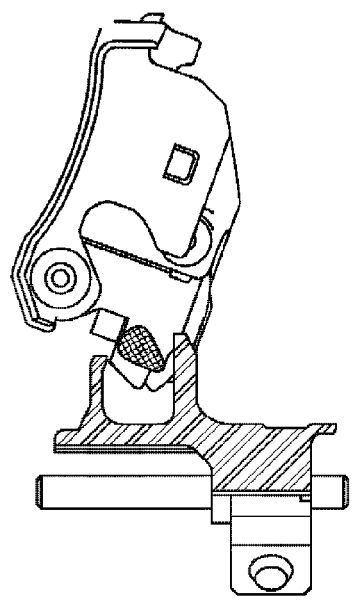

FIGS. 6A through 6C are diagrams illustrating the operation of shifting the light emitting portion between the use state and the accommodated state.

FIG. 6A illustrates the accommodated state, in which the light emitting unit 1 is accommodated. As illustrated in FIG. 6A, in this state, the protrusion 408b is in contact with none of the walls of the U-shaped portion 37a. In this state, the light emitting unit 1 is maintained in the accommodated state by the toggle spring 409, which urges the light emitting unit 1 to the accommodated state.

FIG. 6B illustrates a state in which the slider 37 has moved in the direction of the arrow Q from the state of FIG. 6A. In this state, the wall 37a2 of the U-shaped portion 37a abuts the protrusion 408b, shifting the light emitting unit 1 to the use state against the urging force of the toggle spring 409.

When the slider 37 moves the light emitting unit 1 to a point where the direction of the urging force of the toggle spring 409 is reversed, the urging direction of the toggle spring 409 is reversed, and the light emitting unit 1 is urged toward the use state.

FIG. 6C illustrates the state of the light emitting unit 1 in the use state. At this time, the protrusion 408b is in contact with none of the walls of the U-shaped portion 37a. In this state, the light emitting unit 1 can be maintained in the use state by the toggle spring 409, which urges the light emitting unit 1 toward the use state.

In this way, by moving the slider 37 in the optical axis direction, the light emitting unit 1 is shifted from the accommodated state to the use state.

When shifting the light emitting unit 1 from the use state to the accommodated state, the slider 37 is moved to the left as seen in the diagram from the state of FIG. 6C.

[Outline of the Three Cam Configurations Formed on the Drive Ring 30]

Figure 7A:
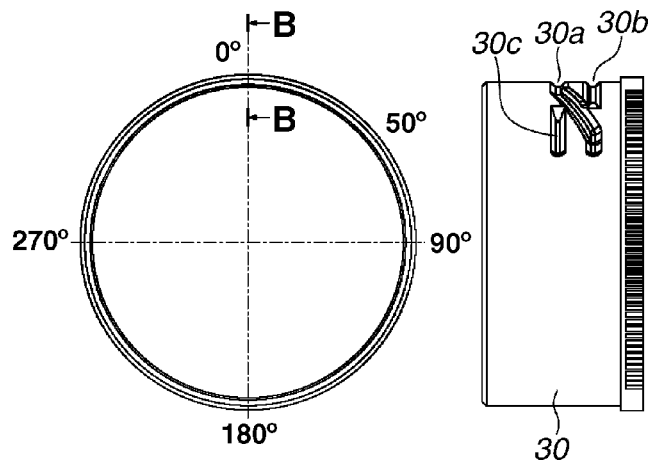
FIGS. 7A through 7C illustrate three cam configurations formed on a drive ring 30.
Figure 7B:
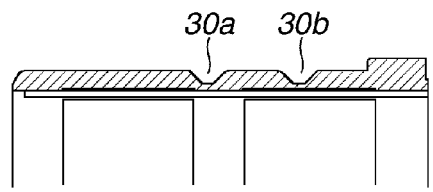
Figure 7C:
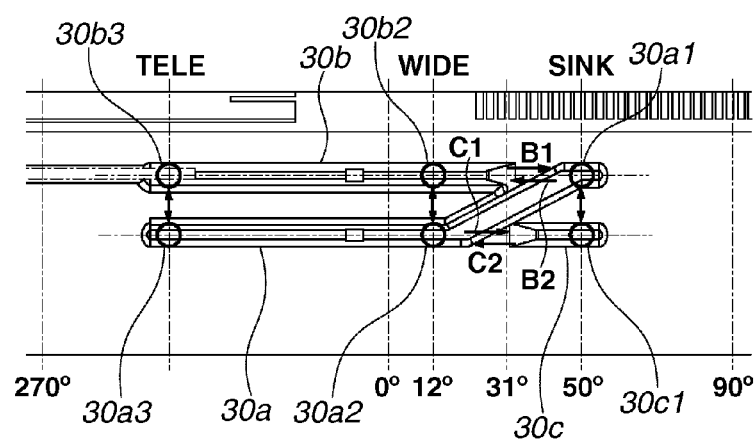

FIGS. 7A through 7C are diagrams illustrating the outline of the three cam configurations formed on the drive ring 30. They will be described in more detail with reference to FIG. 11.

FIG. 7A is a front view and a side view of the drive ring 30. FIG. 7B is a sectional view taken along the line B-B of FIG. 7A. FIG. 7C is an enlarged development of the drive ring 30, illustrating the portion where the first flash unit cam 30a, the second flash unit cam 30b, and the third flash unit cam 30c are formed.

Figure 8A:
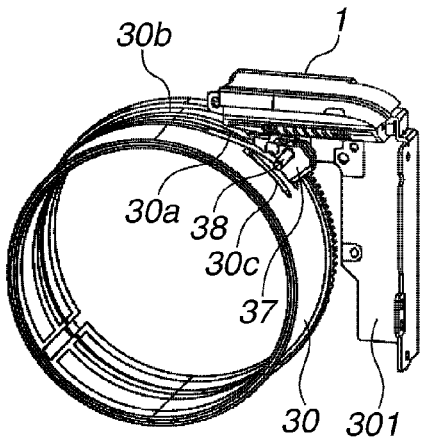
FIGS. 8A through 8D illustrate the operation of the light emitting portion.
Figure 8B:
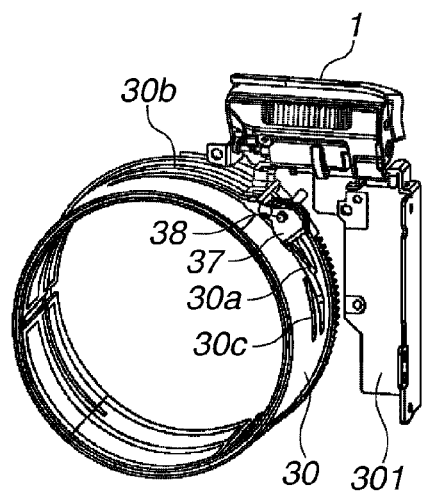
Figure 8C:
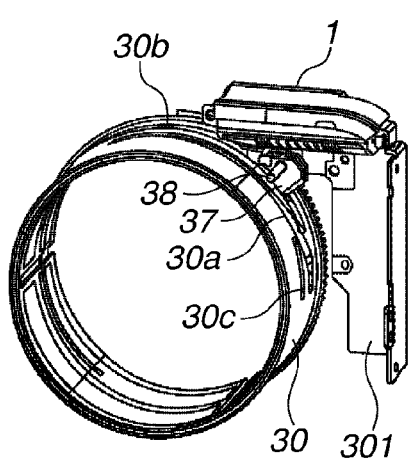
Figure 8D:
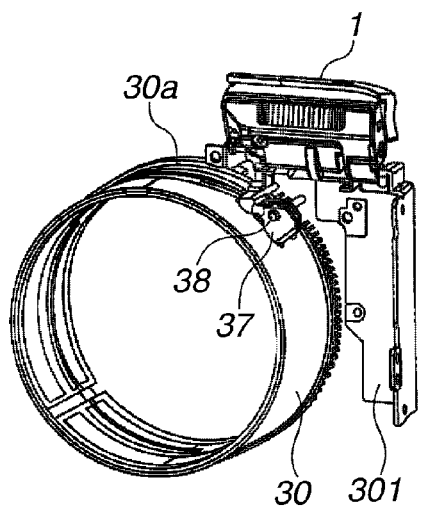

FIGS. 8A through 8D illustrate the operation of the light emitting portion. FIG. 8A illustrates the state of the light emitting portion when the digital camera of the present exemplary embodiment is placed in the state of FIG. 1A. FIG. 8B illustrates the state of the light emitting portion when the digital camera of the present exemplary embodiment is placed in the state of FIG. 1B. FIG. 8C illustrates the state of the light emitting portion when the digital camera of the present exemplary embodiment is placed in the state of FIG. 1C. FIG. 8D illustrates the state of the light emitting portion when the digital camera of the present exemplary embodiment is placed in the state of FIG. 1D.

As illustrated in FIGS. 7A through 7C, the drive ring 30 has a first flash unit cam 30a as a first cam, a second flash unit cam 30b as a second cam, and a third flash unit cam 30c as a third cam.

The first flash unit cam 30a is a cam which places the light emitting unit 1 in the use state from the accommodated state when the lens barrel unit L is placed in the extended state from the retracted state. Further, the first flash unit cam 30a is a cam which places the light emitting unit 1 in the accommodated state from the use state when the lens barrel unit L is placed in the retracted state from the extended state.

Thus, when the light emitting portion is shifted between the state illustrated in FIG. 8A and the state illustrated in FIG. 8B, the flash unit follower 39 of the slider 37 traces the first flash unit cam 30a.

The second flash unit cam 30b is a cam which, when the light emitting unit 1 is placed in the accommodated state, with the lens barrel unit L in the extended state, places the lens barrel unit L in the retracted state from the extended state with the light emitting unit 1 remaining in the accommodated state.

Further, the second flash unit cam 30b is a cam which, when the lens barrel unit L is placed in the extended state from the retracted state, places the lens barrel unit L in the extended state from the retracted state while holding the light emitting unit 1 and keeping it in the accommodated state.

Thus, when the light emitting portion is shifted between the state illustrated in FIG. 8C and the state illustrated in FIG. 8A, the flash light follower 39 of the slider 37 traces the second flash light cam 30b.

The third flash unit cam 30c is a cam which, when the light emitting unit 1 is placed in the use state, with the lens barrel unit L in the retracted state, places the lens barrel unit L in the extended state from the retracted state, with the light emitting unit 1 remaining in the use state.

Further, the third flash unit cam 30c is a cam which, when the lens barrel unit L is placed in the retracted state from the extended state, places the lens barrel unit L in the retracted state from the extended state while holding the light emitting unit 1 and keeping it in the use state.

Thus, when the light emitting portion is shifted between the state illustrated in FIG. 8B and the state illustrated in FIG. 8D, the flash unit follower 39 of the slider 37 traces the third flash unit cam 30c.

As illustrated in FIG. 7B, the first flash unit cam 30a and the second flash unit cam 30b are respectively formed by grooves each having a tapered surface with a taper angle on the side surface thereof. While not shown in section, the third flash unit cam 30c is also formed by a groove having a tapered surface with a taper angle on the side surface thereof.

In FIG. 7C, when the lens barrel unit L illustrated in FIG. 8A is placed in the retracted state, and the light emitting unit 1 is placed in the accommodated state, the flash unit follower 39 of the slider 37 is situated at a position 30a1. When the lens barrel unit L illustrated in FIG. 8B is placed in a WIDE state as the extended state, and the light emitting unit 1 is placed in the use state, the flash unit follower 39 of the slider 37 is situated at a position 30a2.

When the lens barrel unit L is placed in a TELE state as the extended state, and the light emitting unit 1 is placed in the use state, the flash unit follower 39 of the slider 37 is situated at a position 30a3. Between the position 30a1 and the position 30a2, the first flash unit cam 30a shifts the light emitting unit 1 between the accommodated state and the use state, and, between position 30a2 and the position 30a3, the cam lift is set to substantially 0.

As illustrated in FIG. 8B, when the flash unit follower 39 of the slider 37 is situated at the position 30a2, if the light emitting unit 1 is placed in the accommodated state through manual operation, the state as illustrated in FIG. 8C is attained. At this time, the flash unit follower 39 is released from the engagement with the first flash unit cam 30a, and is engaged with the second flash unit cam 30b at the position 30b2.

Similarly, when the flash unit follower 39 is situated at the position 30a3, if the light emitting unit 1 is placed in the accommodated state through manual operation, the flash unit follower 39 is released from the engagement with the first flash unit cam 30a. Then, the flash unit follower 39 is engaged with the second flash unit cam 30b at the position 30b3.

[Operation When the Light Emitting Portion is Manually Operated]

Figure 9A:
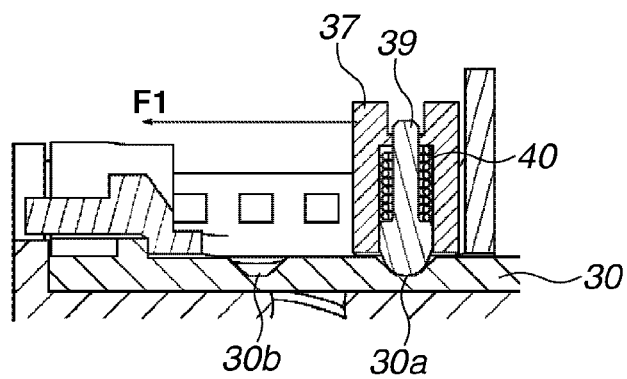
FIGS. 9A through 9D illustrate the operation when the light emitting portion is manually operated.

FIGS. 9A through 9D are diagrams illustrating the operation when the light emitting portion is manually operated. FIG. 9A illustrates a state in which the flash unit follower 39 of the slider 37 is situated at the position 30a2. In this state, when the light emitting unit 1 is accommodated through manual operation, a force in the direction of the arrow F1 is exerted on the slider 37, and the flash unit follower 39 moves in the direction of the arrow P against the urging force of the compression spring 40. That is, the flash unit follower 39 retreats into the slider 37.

As a result, the flash unit follower 39 is released from the engagement with the first flash unit cam 30a, and the slider 37 moves in the direction of the arrow F1. And, when the state illustrated in FIG. 9C is attained, the flash unit follower 39 is inserted into the second flash unit cam 30b by the urging force of the compression spring 40.

At this time, when the flash unit follower 39 is inserted into the second flash unit cam 30b, the forward end of the flash unit follower 39 slides on the slope of the second flash unit cam 39b, so that a force in the direction of the arrow F1 is exerted on the slider 37.

Figure 9B:
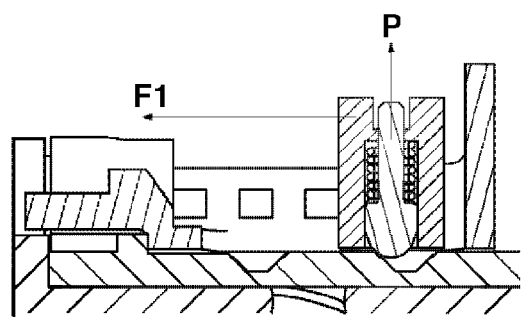
Figure 9C:
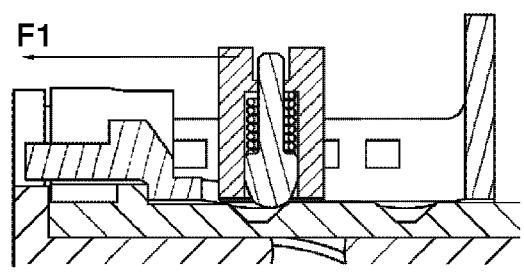
Figure 9D:
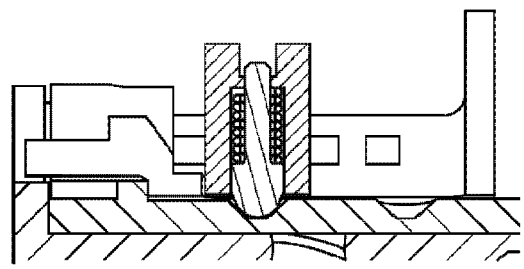

And, as illustrated in FIG. 9D, the flash unit follower is engaged with the second flash unit cam 30b. In this way, the flash unit follower 39 advances and retreats into and out of the hole portion of the slider 37 substantially perpendicular to the outer peripheral surface of the drive ring 30, so that the flash unit follower can be engaged with the cam and be released from the engagement therewith out involving any stress.

At the time of the engagement of the flash unit follower 39 with the second flash unit cam 30b, when the lens barrel unit L is placed in the retracted state from the extended state, the flash unit follower 39 performs tracing to the right-hand end of the second flash unit cam 30b illustrated in FIG. 7C. And, the flash unit follower 39 is released from the engagement with the second flash unit cam 30b, and advances in the direction of the arrow B1 of FIG. 7C to be engaged with the first flash unit cam 30a and situated at the position 30a1.

When the flash unit follower 39 is situated at the position 30a1, the lens barrel unit L is placed in the WIDE state from the retracted state, with the light emitting unit 1 being held and kept in the accommodated state. At this time, the flash unit follower 39 is released from the engagement with the first flash unit cam 30a, and advances in the direction of the arrow B2 of FIG. 7C. And, the flash unit follower 39 is engaged with the second flash unit cam 30b, and is situated at the position 30b2.

As illustrated in FIG. 8A, when the flash unit follower 39 is situated at the position 30a1, if the light emitting unit 1 is placed in the use state through manual operation, the state as illustrated in FIG. 8D is attained. At this time, the flash unit follower 39 is released from the engagement with the first flash unit cam 30a, and is engaged with the third flash unit cam 30c at the position 30c1.

When the flash unit follower 39 is situated at the position 30c1, if the lens barrel unit L is placed in the WIDE state from the retracted state, the flash unit follower 39 is released from the engagement with the third flash unit cam. 30c, and advances in the direction of the arrow C1. And, the flash unit follower 39 is engaged with the first flash unit cam 30a, and is situated at the position 30a2.

When the flash unit follower 39 is situated at the position 30a2, the lens barrel unit L is placed in the retracted state from the WIDE state, with the light emitting unit 1 being held and kept in the use state. At this time, the flash unit follower 39 is released from the engagement with the first flash unit cam 30a, and advances in the direction of the arrow C2 of FIG. 7C. Then, the flash unit follower 39 is engaged with the third flash unit cam 30c, and is situated at the position 30c1.

In the present exemplary embodiment, no connection is effected between the first flash unit cam 30a and the second flash unit cam 30b, and between the first flash unit cam 30a and the third flash unit cam 30c. If, for example, connection is effected between the first flash unit cam 30a and the second flash unit cam 30b, the flash unit follower 39 is placed in a state in which the flash unit follower 39 is situated at the position 30b2 when the flash unit follower 39 is to be placed in the state in which the flash unit follower 39 is situated at the position 30a2 from the state in which it is situated at the position 30a1.

In other words, instead of tracing the first flash unit cam 30a, the flash unit follower 39 traces the second flash unit cam 30b. Therefore, in the present exemplary embodiment, the first flash unit cam 30a and the second flash unit cam 30b, and the first flash unit cam 30a and the third flash unit cam 30c are separated, respectively.

[Operation When Placing the Light Emitting Portion in the Use State through Manual Operation]

FIGS. 10A through 10D illustrate the operation of shifting the light emitting portion, placed in the accommodated state, to the use state.

Figure 10A:
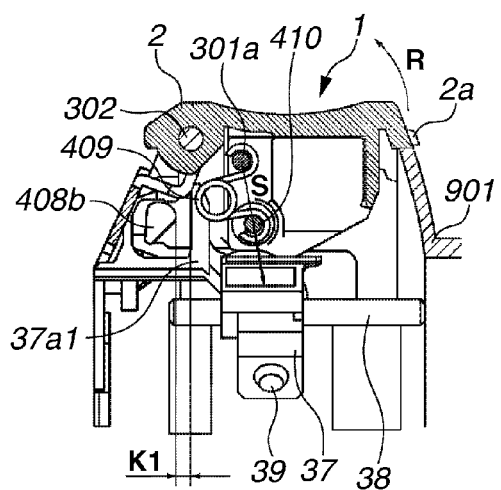
FIGS. 10A through 10D illustrate the operation of shifting the light emitting portion in the accommodated state to the use state through manual operation.

FIG. 10A illustrates the relationship between the slider 37 and the protrusion 408b of the flash unit holder 408 when the light emitting unit 1 is in the accommodated state as illustrated in FIG. 8A or 8C. As illustrated in FIG. 10A, when in the state illustrated in FIG. 8A, the flash unit cam follower 39 is engaged with the first flash unit cam 30a.

As illustrated in FIG. 10A, when the light emitting portion is in the state illustrated in FIG. 8C, the flash unit cam follower 39 is engaged with the second flash unit cam 30b. In the state illustrated in FIG. 10A, a first clearance K1 is formed between the protrusion 408b and the wall 37a1 of the U-shaped portion 37a. In this state, the direction S in which the toggle spring 409 urges the light emitting unit 1 is the direction in which the light emitting unit 1 is urged toward the accommodated state.

When shifting the light emitting unit 1 from the state illustrated in FIG. 10A to the use state through manual operation, a finger is hooked on a protrusion 2a formed on the flash unit cover 2 to perform the manual operation in the direction of the arrow R. When the light emitting unit 1 is rotated in the direction of the arrow R through manual operation, the first clearance K1 is eliminated, and the protrusion 408b abuts the wall 37a1 of the U-shaped portion 37a.

Figure 10B:
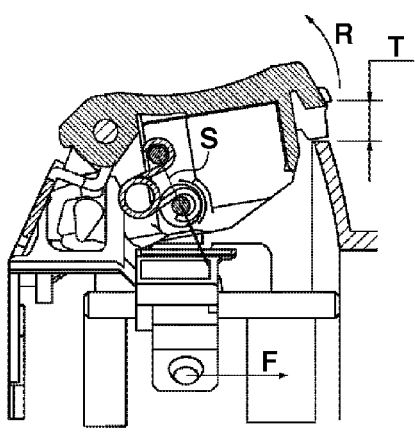

FIG. 10B illustrates this state. In the present exemplary embodiment, when the light emitting portion is placed in the state illustrated in FIG. 10B, the light emitting unit 1 is regarded to be in a first state. At this time, a clearance T is formed between the flash unit cover 2 and a main body cover 901. In the shift from the state of FIG. 10A to the state of FIG. 10B, only the light emitting unit 1 is moved through manual operation, and the slider 37 is not moved.

The requisite manual operational force for the shift from the state of FIG. 10A to the state of FIG. 10B may be necessary to be only larger than the urging force with which the toggle spring 409 urges the light emitting unit 1 toward the accommodated state. Accordingly, the light emitting unit 1 can be shifted from the state of FIG. 10A to the state of FIG. 10B with a relatively small operation force.

When the light emitting unit 1 is further rotated in the direction of the arrow R from the state illustrated in FIG. 10B, the protrusion 408b presses the wall 37a1 of the U-shaped portion 37a, and the slider 37 also moves in the direction of the arrow F.

Figure 10C:
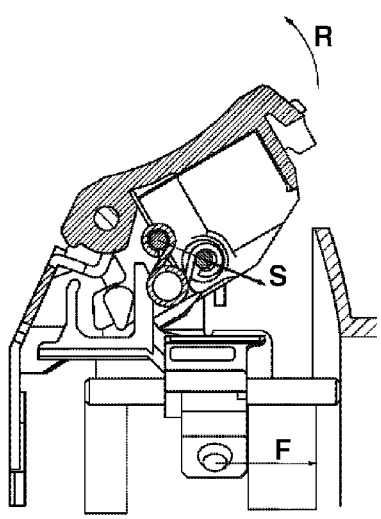

FIG. 10C illustrates a state in which a rotation shaft 302 of the light emitting unit 1 and shafts 301a and 410, on which the toggle spring 409 is hooked, are arranged in a straight line. In this state, the shaft 301a and the shaft 410 are the closest to each other, and the urging force of the toggle spring 409 is the maximum. Thus, beyond this position, the direction S in which the toggle spring 409 urges the light emitting unit 1 changes to the direction in which the light emitting unit 1 is urged to the use state.

The requisite manual operational force from the state of FIG. 10B to the state of FIG. 10C is larger than the resultant force of the urging force with which the toggle spring 409 urges the light emitting unit 1 to the accommodated state and the force with which the slider 37 is moved.

To move the slider 37, it is necessary to release the flash unit cam follower 39 from the engagement with the first flash unit cam 30a or the second flash unit cam 30b. To release the flash unit cam follower 39 from the engagement with the first flash unit cam 30a or the second flash unit cam 30b, it is necessary to provide a force causing the flash unit follower 39 to retreat into the slider 37 against the urging force of the compression spring 40.

Therefore, the requisite manual operational force for the shift from the state of FIG. 10B to the state of FIG. 10C is larger than the requisite manual operational force for the shift from the state of FIG. 10A to the state of FIG. 10B. In the state of FIG. 10B, it is possible to hook a finger through the clearance T formed between the flash unit cover 2 and the main body cover 901, so that it is easier to apply a force to the light emitting unit 1.

In the shift from the state of FIG. 10A to the state of FIG. 10B, in which the clearance T is not formed, it is necessary to push up the protrusion 2a of the flash unit cover 2, so that the requisite manual operational force is made relatively small. By increasing the size of the protrusion 2a, it is also possible to push up the light emitting unit 1 from the accommodated state with a relatively large force, however, enlarging the protrusion 2a is not desirable from the viewpoint of the design of the digital camera.

In view of this, in the digital camera of the present exemplary embodiment, the first clearance K1 is formed so that an operational force allowing manual operation may be attained even with a small protrusion for the shift of the light emitting unit 1 from the accommodated state to the first state.

Figure 10D:
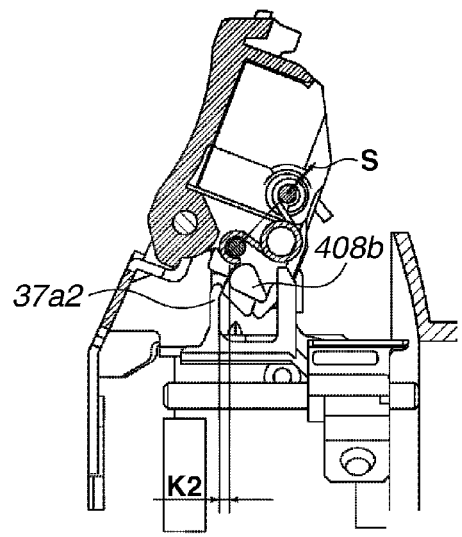

FIG. 10D illustrates the relationship between the slider 37 and the protrusion 408b of the flash unit holder 408 when the light emitting portion is in the accommodated state as illustrated in FIG. 8B or FIG. 8D. As illustrated in FIG. 10D, when the apparatus is in the state illustrated in FIG. 8B, the flash unit cam follower 39 is engaged with the first flash unit cam 30a. As illustrated in FIG. 10D, when the light emitting portion is in the state illustrated in FIG. 8D, the flash unit cam follower 39 is engaged with the third flash unit cam 30c.

In the state illustrated in FIG. 10D, the direction S in which the toggle spring 409 urges the light emitting unit 1 is the direction in which the light emitting unit 1 is urged toward the use state. In this state, a second clearance K2 is formed between the protrusion 408b and the wall 37a2 of the U-shaped portion 37a.

When the light emitting portion is placed in the state illustrated in FIG. 10D, the light emitting unit 1 is urged toward the use state by the toggle spring 409, and the flash unit cam follower 39 is engaged with the first flash unit cam 30a or the third flash unit cam 30c.

When the flash unit cam follower 39 starts to be engaged with the first flash unit cam 30a or the third flash unit cam 30c, the slider 37 is drawn to the right as seen in the diagram. This is due to the fact that the slider 37 is moved through the insertion of the flash unit cam follower 39 urged by the compression spring 40 into the first flash unit cam 30a or the second flash unit cam 30c.

As a result, even in the state illustrated in FIG. 10D, a clearance is formed between the protrusion 408b and the wall 37a1 of the U-shaped portion 37a.

In the state illustrated in FIG. 10D, when shifting the light emitting unit 1 to the state illustrated in FIG. 10A through manual operation, first, until the second clearance K2 is eliminated, it is possible to press down the light emitting unit 1 only with a force against the urging force of the toggle spring 409.

Then, the protrusion 408b abuts the wall 37a2 of the U-shaped portion 37a, and the slider 37 is moved to attain the state illustrated in FIG. 10A. The state in which the second clearance K2 is eliminated and the protrusion 408b abuts the wall 37a2 of the U-shaped portion 37a, is referred to as a second state.

Also in FIG. 10A, the slider 37 is moved through the insertion of the flash unit cam follower 39 urged by the compression spring 40 into the first flash unit cam 30a or the second flash unit cam 30b. Thus, a clearance is formed between the protrusion 408b and the wall 37a2 of the U-shaped portion 37a.

As described above, in the digital camera of the present exemplary embodiment, the light emitting portion is placed in the use state from the accommodated state when transition is effected from the power OFF state, which is an example of the unphotographable state, to the power ON state, which is an example of the photographable state. And, when the light emitting portion is in the use state, with the power ON, it is possible to effect transition from the use state to the accommodated state through manual operation, and it is possible to attain the power OFF state, with the light emitting portion remaining in the accommodated state.

Further, when the light emitting portion is in the accommodated state, with the power being OFF, it is possible to effect transition from the accommodated state to the use state through manual operation, and it is possible to attain the power ON state, with the light emitting portion remaining in the use state.

Thus, in spite of the construction in which the light emitting portion is shifted between the use state and the accommodated state in synchronization with the movement of the lens barrel unit, it is also possible to shift the light emitting portion between the use state and the accommodated state through manual operation regardless of whether the power is ON or OFF. Further, after the light emitting portion has been moved through manual operation, it is possible to turn on and off the power source of the digital camera, with the light emitting portion remaining as it is.

In other words, even when the light emitting portion is accommodated through manual operation with the power ON, and then the power is turned off, by subsequently turning on the power, the light emitting portion is placed in the use state from the accommodated state. Similarly, by turning off the power after the light emitting portion is placed in the use state through manual operation with the power OFF and then the power is turned on, the light emitting portion is placed in the accommodated state from the use state.

And, due to the formation of the first clearance K1, when the light emitting unit 1 is shifted from the accommodated state to the use state through manual operation, the slider 37 does not move, and the light emitting unit 1 is shifted from the accommodated state to the first state. And, when the light emitting unit 1 and the slider 37 start to move integrally, the clearance T is formed, making it easier to apply a large force to the light emitting unit 1.

[Point to be Taken into Account When the Cam Illustrated in FIGS. 7a Through 7c is Used as it is]

There have been described above the outline of the configurations of the three cams formed on the drive ring 30 with reference to FIGS. 7A through 7C; the operation of the light emitting portion with reference to FIGS. 8A through 8C; the operation when the light emitting portion is operated manually with reference to FIGS. 9A through 9C; and the operation of placing the light emitting portion in the use state from the accommodated state through manual operation. However, the following point should be taken into account.

For example, when, in FIG. 7C, transition is effected from the state in which the flash unit follower 39 is at the position 30b2 to the state in which it is at the position 30a1 through rotation of the drive ring 30, there is generated a movement in which the light emitting unit 1 is temporarily shifted from the accommodated state to the use state. This is due to the behavior of the flash unit follower 39 when it is released from the engagement with the second flash unit cam. 30b and climbs the outer peripheral surface of the drive ring 30, and then starts to be engaged with the first flash unit cam. 30a.

That is because, when the flash unit follower 39 starts to be engaged with the first flash unit cam 30a, a component of the compression spring 40 is exerted downwardly as seen in the plane of FIG. 7C, that is, so as to place the light emitting unit 1 in the use state. This is due to the fact that the inclination of the first flash unit cam 30a with respect to the rotation of the drive ring 30 is relatively gentle, and that it is formed by the taper angle of the tapered cam groove side surface of the first flash unit cam 30a (See FIG. 7B).

As a result of such unintentional opening and closing of the light emitting unit 1, a noise or the like is also generated, and the user may erroneously judge that the camera is out of order.

[Cam Configurations Formed on the Drive Ring 30]

In view of the above point, the cams formed on the drive ring 30 have the configurations as illustrated in FIG. 11. In FIG. 11, to facilitate the understanding, the illustration of the flash unit cam 30c is omitted.

As for the third flash unit cam 30c, there is also generated the same problem as described above. That is, when the flash unit follower 39 is shifted to the state in which it is at the position 30c1 to the state in which it is at the position 30a2 through rotation of the drive ring 30, there is generated a movement in which the light emitting unit 1 is temporarily shifted from the use state to the accommodated state. This can also be solved or mitigated by a measure similar to the one described below.

As illustrated in FIG. 11, this case is different from the one illustrated in FIG. 7C in the following points. First, regarding the first flash unit cam 30a, in the region for transition of the optical unit from the use state to the accommodated state, there are provided a first inclined portion having an inclination θ1 and a second inclined portion having an inclination θ2 with respect to the rotation of the drive ring 30.

As compared with the inclination θ1, the inclination θ2 is sufficiently steeper, and it is desirable for the inclination θ2 to be infinitely close to 90°. Regarding the second flash unit cam 30b, in the region for transition of the optical unit from the use state to the accommodated state, it is formed so that the cam groove center thereof is further shifted in the flash unit closing direction than in the state in which the flash unit is closed.

Here, as illustrated in FIG. 11, the central position of the cam groove of the second cam is positioned on the imaging surface side of the accommodated position 30a1 of the first cam. The function due to the inclined cam configuration thus formed will be described below.

First, how the first flash unit cam 30a and the flash unit follower 39 are engaged with each other when opening/closing the light emitting unit 1 automatically, will be described below.

When the power source of the camera is turned on, and the drive wheel 30 of FIG. 11 rotates in a direction α, the flash unit follower 39 moves from the position 30a1. The flash unit follower 39 abuts a cam surface 30aa of the first inclined portion, and is pushed toward the subject side integrally with the slider 37, thus starting to move (FIG. 6B).

The cam surface 30aa is a surface exhibiting the gentle inclination angle θ1 with respect to the rotating direction of the drive ring 30. The flash unit follower 39 is gradually moved toward the subject side by the cam surface 30aa, and, as described with reference to FIGS. 6 and 10, exceeds the state in which the shaft 301a and the shaft 410 are closest to each other. Then, the urging direction of the toggle spring 409 is switched, and the flash unit follower 39 is detached from the cam surface 30aa of the first flash unit cam 30a to be pressed against a cam surface 30ab (FIG. 6C).

Until detached from the cam surface 30aa and pressed against the cam surface 30ab, the flash unit follower 39 is moved by the urging force of the toggle spring 409. At this time, the urging force of the toggle spring 409 is relatively large, so that the flash unit follower 39 moves against the frictional force of the forward end portion of the flash unit follower 39 and the cam bottom of the first flash unit follower 30a due to the compression spring 40.

While kept in contact with the cam surface 30ab due to the pressing force of the toggle spring 409 toward the cam surface 30ab, the flash unit cam follower 30a reaches the position 30a2 to attain the WIDE state. Like the cam surface 30aa, the cam surface 30ab is on the first inclined portion.

Between the position 30a2 and the position 30a3, the cam is formed parallel to the rotating direction of the drive ring 30, so that the slider 37 is kept at a fixed position in the optical axis direction, and the light emitting unit 1 remains in the open state as illustrated in FIG. 6C. In this case, the cam is cut parallel to the rotating direction, however, the cam may have an inclination to realize a zoom flash unit function.

When the flash unit follower 39 is at the position 30a3, and the power source of the digital camera is turned off, a route reverse to the one described above is traced. When the power source of the digital camera is turned off, and the drive ring 30 of FIG. 11 rotates in a direction β, the flash unit follower 39 maintains a fixed position with respect to the optical axis direction from the position 30a3 to the position 30a2.

Thus, the light emitting unit 1 remains in the open state as illustrated in FIG. 6C. From the position 30a2, the flash unit follower 39 abuts the cam surface 30ab of the first inclined portion of the angle θ1 of the first flash unit cam 30a. As a result of this abutment, the flash unit follower 39 is pushed to the imaging surface side (upwardly as seen in FIG. 11) through the engagement with the slider 37 and starts to move. At this time, the U-shaped portion 37b of the slider 37 abuts the protrusion 408b of the flash unit holder 408, whereby the light emitting unit is gradually closed.

When the flash unit holder 408 is further moved toward the imaging surface side by the cam surface 30ab, it exceeds the condition in which the distance between the shaft 301a and the shaft 410 is minimum as described with reference to FIGS. 6 and 10. Then, the urging direction of the toggle spring 409 is switched. At this time, the urging force of the toggle spring 409 is relatively strong, so that the flash unit cam follower 39 moves against the frictional force between the forward end portion of the flash unit cam follower 39 and the cam bottom of the first flash unit cam 30a due to the compression spring 40.

Then, the flash unit follower 39 is pressed against the cam surface 30aa of the drive ring 30 (FIG. 5A), and reaches the position 30a4 while kept in contact with the cam surface 30aa by this pressing force.

At this time, the shaft 301a and the shaft 410 are relatively spaced apart from each other, so that the urging force of toggle spring 409 is relatively weak. Thus, the spring force of the compression spring 40 of the slider 37 is sufficiently larger than that of the toggle spring 409, so that no movement of the flash unit follower 39 occurs from the position 30a4, which is an end portion of the cam surface 30aa, toward the cam surface 30ac.

The flash unit follower 39 moves to the position 30a1 while maintaining its position in the optical axis direction by the frictional force between the flash unit follower 39 and the cam bottom surface.

Next, a case in which, in the use state of the light emitting unit 1 (between the WIDE state and the TELE state and between the positions 30a2 and 30a3), the light emitting unit 1 is switched to the accommodated state through manual operation, will be described.

When the light emitting unit 1 is placed in the accommodated state through manual operation, the flash unit follower 39 is engaged with the second flash unit cam 30b via the route as described with reference to FIG. 9. As the second flash unit cam 30b, there is provided a parallel cam exhibiting no inclination with respect to the rotating direction of the drive ring 30 when the flash unit follower 39 is between the position 30b2 and the position 30b3. Thus, the light emitting unit 1 is maintained in the accommodated state.

When, between the position 30b2 and the position 30b3, the power source of the digital camera is turned off, the drive ring 30 rotates in the direction β in FIG. 11. When the flash unit follower 39 goes beyond the position 30b2, it moves toward the imaging surface side integrally with the slider 37 due to the cam surface 30ba (The light emitting unit 1 remains in the closed state).

When the drive ring 30 further continues to rotate, the flash unit follower 39 reaches the end portion of the cam surface 30ba, and climbs the outer peripheral surface of the drive ring 30. Here, the second flash unit cam 30b on which the cam surface 30ba exists has a third inclined portion having an inclination angle θ3 with respect to the rotation of the drive ring 30. And, the flash unit follower slides down on the cam surface 30ac of the flash unit cam 30a, and moves to the position 30a5.

As a result, the flash unit follower 39 is transferred from the flash unit cam 30b to the flash unit cam 30a. The angle of the third inclined portion may be smaller than that of the first inclined portion and of the second inclined portion. This is because, the third inclined portion is provided for the purpose of preventing movement of the flash unit follower 39 to the subject side when the engagement is shifted from the second flash unit cam 30b to the first flash unit cam 30a.

Here, when the flash unit follower 39 slides down on the cam surface 30ac to move to the position 30a5, the force exerted to the subject side in the optical direction is sufficiently smaller as compared with that in the case of FIG. 7C. This is because, the cam surface 30ac is of the angle θ2, which is relatively steep with respect to the rotating direction of the drive ring 30 (θ1<<θ2), so that, despite the taper angle of the tapered cam groove side surface of the first flash unit cam 30a, the component due to the urging force of the compression spring 40 is small.

Thus, unlike the case of the construction of FIG. 7C, in the construction described with reference to FIG. 11, together with the presence of the first clearance K1, the slider 37 is not moved to the subject side until the light emitting unit 1 is opened in the direction of the use state.

After the drive ring 30 further rotates, and the flash unit follower 39 has moved on the bottom surface of the first flash unit cam 30a, it abuts the cam surface 30ad. While being kept in contact with the cam surface 30ad, the flash unit follower 39 moves toward the subject side integrally with the slider 37 to reach the position 30a1.

As described above, when the flash unit cam follower 39 receives the rotational force of the drive ring 30 and moves from the position 30a1 to the position 30a2, it moves by way of the position 30a4.

On the other hand, when the flash unit cam follower 39 receives the rotational force of the drive ring 30 and moves from the position 30b2 to the position 30a1, it moves by way of the position 30a5. This causes the position 30a1 and the center line of the second flash unit cam 30b to be shifted in the optical axis direction by a distance L.

As a result, at the time of movement, for example, from the position 30a1 to the position 30a2, by utilizing the difference in urging force between the compression spring 40 and the toggle spring 409 as described above, the possibility of the cam surface 30ac being abutted is reduced.

This makes it easier for the flash unit cam follower 39 to move along the first flash unit cam 30a. That is, the passing positions in the optical axis direction of the flash unit follower 39 is further spaced apart from each other, and the flash unit cam follower 39 is accurately placed on the cam surface 30aa and the cam surface 30ac.

Next, a case in which the power source of the digital camera is turned on while holding the light emitting unit 1 by hand and forcibly keeping it in the accommodated state, will be described.

Through the rotation of the drive ring 30, the flash unit follower 39 is moved from the position 30a1 to the position 30b2 by way of a position 30a4. The position 30a4 is on the cam surface 30aa with the gentle inclination angle θ1 of the first flash unit cam 30a. Since the light emitting unit 1 is kept in the accommodated state by hand, the flash unit follower 39 does not move in the optical axis direction integrally with the slider 37, but climbs up the cam surface 30aa of the flash unit cam 30a while staying at the same position in the optical axis direction.

And, integrally with the slider 37, the flash unit follower 39 slides down on the cam surface 30ba of the third inclined portion of the flash unit cam 30b by way of the outer peripheral surface of the drive ring 30 to reach the WIDE position. When moving from the outer peripheral surface of the drive ring 30 to the position 30b2, the slider 37 moves so as to further close the light emitting unit 1. This is due to the fact that the inclination of the second flash unit cam 30b portion having the cam surface 30ba is steep with respect to the rotation of the drive ring 30 (the angle θ3).

Further, when the flash unit follower 39 collides with the cam surface 30ac as a result of the rotation of the drive ring 30, the abutment impact of the cam surface 30ac is too strong, and the cam surface 30ac is worn away as the camera operation is continued. When a groove due to the wear is formed in the cam surface 30ac, the flash unit follower 39 passes that groove, and is moved toward the flash unit cam 30f even when the light emitting unit 1 is not kept in the closed state by forcibly holding it by hand, with the result that the light emitting unit 1 fails to open.

For this reason, it is necessary to use, as appropriate, either of the cam surface 30aa with the gentle angle θ1 with respect to the rotating direction of the drive ring 30, and the cam surface 30ac with the angle θ2, which is steep. Therefore, the position 30a1 and the center line of the second flash unit cam 30b are shifted in the optical axis direction by the distance L.

In the present exemplary embodiment, there has been described a mechanism which helps to prevent unintentional opening/closing of the light emitting unit 1 when turning off the power source of the digital camera after placing the light emitting unit 1 in the accommodated state through manual operation in the use state of the digital camera. In this regard, it is desirable to provide a cam surface of a similar construction also when there is the third flash unit cam 30c allowing switching of the light emitting unit to the use state through manual operation in the accommodated state of the light emitting unit 1.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-024603 filed Feb. 5, 2010, which is hereby incorporated by reference herein in its entirety.

What is claimed is:

1. An imaging apparatus comprising:

a drive source;

a driven member driven by the drive source;

a light emitting unit connected to an interlock portion interlocked with the driven member;

a first cam formed on the driven member, wherein the first cam has a first inclined portion and configured to, when the first cam is engaged with the interlock portion and the imaging apparatus is placed in a photographable state, place the light emitting unit in a use state, and when the imaging apparatus is placed in an unphotographable state, place the light emitting unit in an accommodated state, wherein the first cam has, apart from the first inclined portion engaged with the interlock portion in transition of the imaging apparatus from the unphotographable state to the photographable state, a second inclined portion more inclined than the first inclined portion; and a second cam formed on the driven member, wherein in a case where the light emitting unit is shifted from the use state to the accommodated state through manual operation when the imaging apparatus is placed to the photographable state, the interlock portion is engaged after being released from the engagement with the first cam to be engaged with the second cam, wherein in a state where the second cam is engaged with the interlock portion, when the imaging apparatus is placed in the unphotographable state from the photographable state, the second cam is configured to be released from the engagement with the interlock portion before the light emitting unit is engaged with the first cam;

wherein, when the imaging apparatus is placed from the photographable state to the unphotographable state, the engagement portion is released from the engagement with the second cam to be engaged with the second inclined portion of the first cam.

2. The imaging apparatus according to claim 1, further comprising a third cam configured to move the light emitting unit to an imaging surface side when the light emitting unit is engaged with the second inclined portion of the first cam after being released from the engagement with the second cam when placing the imaging apparatus from the photographable state in the unphotographable state.

3. The imaging apparatus according to claim 1, wherein a central position of a cam groove of the second cam is on an imaging surface side of the accommodated position of the first cam.

4. The imaging apparatus according to claim 1, wherein, when the light emitting unit is accommodated through rotation of the driven member, the engagement of the light emitting unit is shifted to the accommodated position of the first cam without moving by way of the second inclined portion after moving by way of the first inclined portion of the first cam.

5. The imaging apparatus according to claim 2, wherein a central position of a cam groove of the second cam is on an imaging surface side of the accommodated position of the first cam.

* * * * *